(No Model.)
L. HAMMEL.
SPECTACLES.
No. 363,632. Patented May 24, 1887.
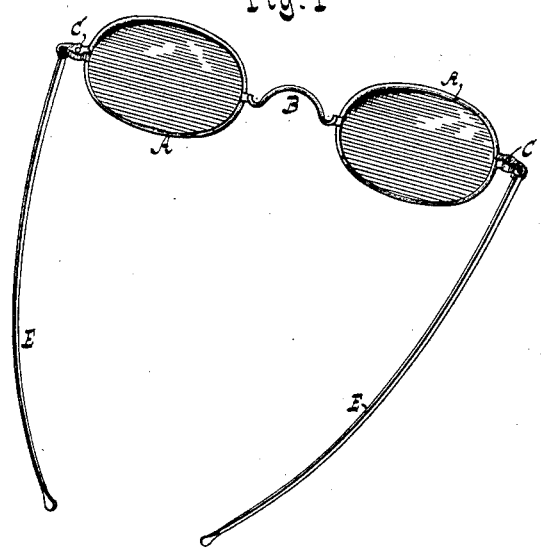
Fig. 1
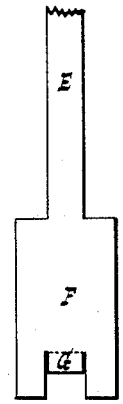
Fig. 2
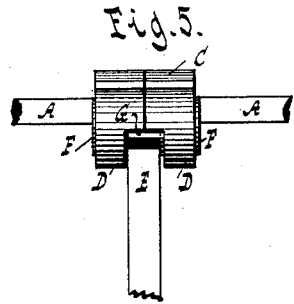
Fig. 5.
Fig. 3.
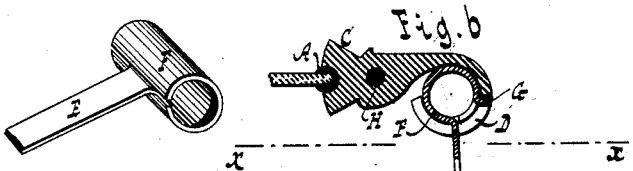
Fig. 6.
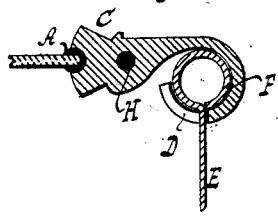
Fig. 8.
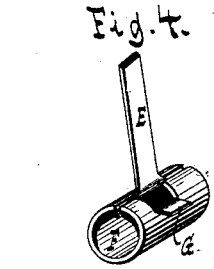
Fig. 4.
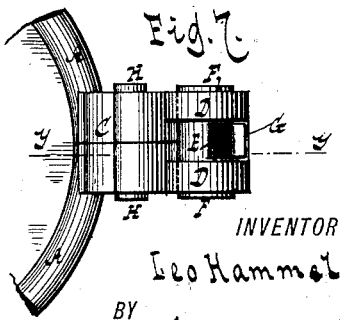
Fig. 7.
WITNESSES:
INVENTOR
Leo Hammel.
BY Van Santvoord & Hauff
his ATTORNEYS

UNITED STATES PATENT OFFICE.

LEO HAMMEL, OF NEW YORK, N. Y.

SPECTACLES.

SPECIFICATION forming part of Letters Patent No. 363,632, dated May 24, 1887.

Application filed February 3, 1887. Serial No. 226,413. (No model.)

*To all whom it may concern:*

Be it known that I, LEO HAMMEL, a citizen of the United States, residing at New York, in the county and State of New York, have invented a new and useful Improvement in Spectacles, of which the following is a specification.

This invention relates to an improvement in spectacles, as set forth in the following specification and claims, and illustrated in the accompanying drawings, in which—

Figure 1 is a perspective view of a spectacle. Fig. 2 is a detail view of a blank for a temple. Fig. 3 is a perspective view of an end of a temple without a stop. Fig. 4 is a perspective view of an end of a temple with a stop. Fig. 5 is an end view of an end piece and temple. Fig. 6 is a section in the plane *y y*, Fig. 7. Fig. 7 is a section in the plane *x x*, Fig. 6. Fig. 8 shows an application of the temple shown in Fig. 3.

Similar letters indicate corresponding parts.

In the drawings, A A indicate eye-frames. B is the nose-piece. C C are the end pieces. E E are the temples. The end pieces can be constructed in sections, held together by a rivet or screw, H, in the usual way.

The end pieces, C, are provided with tongues D. In the space between the tongues D the temple E is adapted to move or swing. The tongues D are bent or hook-shaped, so as to clasp the pivot F of the temple. By having a space between the free ends of the tongues D and the end pieces, C, the tongues D, which are of flexible material, can be tightened about the pivot F. Compensation can thus be made for wear or friction.

The temple E is formed from a blank shown in Fig. 2. By providing the temple-blank with a laterally-projecting enlargement, F, and bending said enlargement to the form shown in Fig. 3, a pivot F is formed on the temple E. If it is desired to provide the temple with a stop, the blank is provided with a tongue, G, Fig. 2, and by bringing said tongue into proper position a stop G is formed, as seen in Fig. 4. The stop G limits the play of the temple E on its pivot, as seen in Figs. 5 and 6.

The pivot F is hollow, as seen, and if said pivot F becomes worn compensation for the wear can be made by spreading the pivot F.

The stop G also can easily be brought or bent into such position as required.

By having the temple E, pivot F, and stop G in one piece, said parts are not likely to become detached or lost.

When the temple has a stop G, as seen in Fig. 6, the stop G can be made to limit the motion of the temple by striking against the end piece, C.

When the temple has no stop, as seen in Figs. 3 and 8, the motion of the temple E can be limited by the latter striking against the end piece, C.

What I claim as new, and desire to secure by Letters Patent, is—

1. The combination, with the eye-frame A, of the end piece, C, the two curved tongues D upon said end piece, and having their adjacent edges separated from each other to provide an intervening space, a pivot, F, and a temple, E, capable of swinging in said space between the separated edges of the tongues, the ends of said tongues terminating adjacent to the end piece, substantially as described.

2. The combination, with the eye-frame A, of the end piece, C, the two curved flexible tongues D upon said end piece, and having their adjacent edges separated from each other to provide an intervening space, a pivot, F, and a temple, E, capable of swinging in said space between the separated edges of the tongues, said flexible tongues having their ends terminating at a distance from the end piece and adjustable to and from the same, substantially as described.

3. The combination, with the end piece, C, of the two curved tongues D upon said end piece, and having their adjacent edges separated from each other to provide an intervening space, a pivot, F, and a temple, E, formed with the pivot F, which is arranged to turn in said end piece, said temple being capable of swinging in the space between the separated edges of the tongues, and the ends of the latter terminating adjacent to the end piece, substantially as described.

4. A temple, E, provided with a tubular longitudinally-split pivot, F, capable of expanding in diameter, substantially as described.

5. The combination, with the end piece, C, of the two flexible curved tongues D, having their adjacent edges separated to provide an intervening space, a split pivot, F, which is expansible in diameter, and a temple, E, adapted to swing in the space between the tongues, and the ends of the latter being adjustable to and from the end piece, substantially as described.

6. The combination, with the end piece, C, and the two curved tongues D on said end piece, and having their adjacent edges separated to provide an intervening space, of a temple, E, adapted to swing in said space, and having an attached tubular split pivot, F, expansible in diameter, substantially as described.

7. The combination, with the end piece, C, and two curved tongues, D, on said end piece, and having their adjacent edges separated by a space, of a temple, E, having a pivot, F, provided intermediate its ends with a stop, G, which, with the temple, moves in the space between the said tongues, substantially as described.

8. The temple E, provided with the tubular expansible pivot F, formed with the laterally-projecting stop G intermediate its ends, in combination with the end piece, C, substantially as described.

9. The temple E, provided with the pivot F, formed with the laterally-projecting flexible and adjustable stop G intermediate its ends, in combination with the end piece, C, substantially as described.

In testimony whereof I have hereunto set my hand and seal in the presence of two subscribing witnesses.

LEO HAMMEL. [L. S.]

Witnesses:
   B. H. BLANK,
   CHAS. E. BUENTE.